US012075944B2

(12) United States Patent
Itzkowitz et al.

(10) Patent No.: US 12,075,944 B2
(45) Date of Patent: Sep. 3, 2024

(54) AIR FRYER BASKET ACCESSORY FOR AIR FRYER

(71) Applicant: The Steelstone Group LLC, Brooklyn, NY (US)

(72) Inventors: Binyumen Itzkowitz, Brooklyn, NY (US); Meilech Friedman, Brooklyn, NY (US); Joseph Deutsch, Brooklyn, NY (US); Kalman Wertzberger, Brooklyn, NY (US); Robyn De Luca, Queens, NY (US); Wenhui Huang, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 174 days.

(21) Appl. No.: 17/157,021

(22) Filed: Jan. 25, 2021

(65) Prior Publication Data

US 2021/0235926 A1 Aug. 5, 2021

Related U.S. Application Data

(60) Provisional application No. 62/969,885, filed on Feb. 4, 2020.

(51) Int. Cl.
*A47J 37/06* (2006.01)
(52) U.S. Cl.
CPC ....... *A47J 37/0664* (2013.01); *A47J 37/0611* (2013.01); *A47J 37/0641* (2013.01)
(58) Field of Classification Search
CPC ............... A47J 37/0664; A47J 37/0611; A47J 37/0641; A47J 37/041; A47J 37/043
See application file for complete search history.

(56) References Cited

U.S. PATENT DOCUMENTS

| 4,803,918 | A | * | 2/1989 | Carbon | A47J 37/0611 |
| | | | | | 219/524 |
| 10,837,651 | B2 | * | 11/2020 | Bruin-Slot | A47J 37/0641 |
| 2007/0074629 | A1 | * | 4/2007 | Lubowicki | A47J 37/0611 |
| | | | | | 99/372 |
| 2009/0178574 | A1 | * | 7/2009 | Martinez | A47J 37/0611 |
| | | | | | 99/349 |

(Continued)

FOREIGN PATENT DOCUMENTS

| CN | 205072703 U | * | 3/2016 |
| CN | 205072703 U | | 3/2016 |

(Continued)

OTHER PUBLICATIONS

International Search Report and Written Opinion issued by the International Searching Authority for corresponding International Patent Application No. PCT/US2021/014904, mailed on Apr. 29, 2021.

(Continued)

*Primary Examiner* — Helena Kosanovic
*Assistant Examiner* — Thao Uyen Tran-Le
(74) *Attorney, Agent, or Firm* — Myers Wolin, LLC

(57) ABSTRACT

An air fryer comprises: an air fryer basket; and an air fryer basket accessory. The fryer basket accessory comprises: a first plate configured to be supported by the air fryer basket; and a second plate rotatably connected to the first plate, the second plate configured to be supported by the air fryer basket.

20 Claims, 16 Drawing Sheets

(56) References Cited

U.S. PATENT DOCUMENTS

| | | | |
|---|---|---|---|
| 2010/0199858 A1* | 8/2010 | Chang | A47J 37/0611 99/427 |
| 2012/0037012 A1* | 2/2012 | Stier | A47J 37/0704 99/421 H |
| 2012/0266760 A1* | 10/2012 | Bryce | A47J 37/067 99/448 |
| 2015/0122136 A1* | 5/2015 | Chen | A47J 27/002 99/427 |
| 2016/0213197 A1* | 7/2016 | Zhan | A47J 37/0611 |
| 2018/0125293 A1* | 5/2018 | McNerney | A47J 37/0641 |
| 2019/0208958 A1* | 7/2019 | Zhang | A47J 37/0664 |
| 2019/0246835 A1* | 8/2019 | Tsai | A47J 37/0664 |
| 2020/0113380 A1* | 4/2020 | Lu | A47J 37/041 |
| 2021/0219778 A1* | 7/2021 | Senders | A47J 37/0664 |

FOREIGN PATENT DOCUMENTS

| | | |
|---|---|---|
| CN | 205215045 U | 5/2016 |
| CN | 205923814 U | 2/2017 |
| DE | 20 2017 102 536 U1 | 9/2018 |
| ES | 2 616 349 T3 | 11/2016 |
| KR | 100818391 B1 * | 4/2008 |
| KR | 101638781 B1 * | 7/2016 |
| WO | 2018223713 A1 | 12/2018 |

OTHER PUBLICATIONS

Extended European search report issued by the German Patent Office for European Patent Application No. 21751433.0, dated Dec. 8, 2023.

* cited by examiner

AIR FRYER BASKET ACCESSORY FOR AIR FRYER

CROSS-REFERENCE TO RELATED APPLICATIONS

This application claims the benefit of U.S. Provisional Application No. 62/969,885, filed Feb. 4, 2020, the contents of which are incorporated by reference herein.

FIELD

The present disclosure generally relates to an air fryer basket accessory for an air fryer.

BACKGROUND

Air fryer cooking appliances are used to reduce the quantity of fat used to cook foods of plant or animal origin, such as French fries, vegetables, meat or fish. The cooking takes place with little or no oil because of the hot air circulating inside the fryer, making it possible to eat healthier foods that are crisp on the outside and soft on the inside.

However, the use of an air fryer is limited to items that can be cooked while located in a relatively open basket. There is a need for an air fryer accessory that can be used to cook foods requiring specialized cooking implements.

SUMMARY

An embodiment of the present disclosure provides air fryer basket accessory including a first plate and a second plate. The first plate is configured to be supported by an air fryer basket. The second plate is rotatably connected to the first plate. The second plate is configured to be supported by the air fryer basket.

In one example, the air fryer basket accessory further comprises a first support extending from at least one of the first plate and the second plate, the first support being configured to be supported by the air fryer basket.

In one example, the air fryer basket accessory further comprises a second support extending from at least one of the first plate and the second plate, the second support being configured to be supported by the air fryer basket. The first support and the second support extend along a same linear axis.

In one example, the first support includes: a first extension extending from the first plate; and a second extension extending from the second plate.

In one example, the air fryer basket accessory further comprises a handle configured to be fixed to the first extension of the first support.

In one example, the handle is removable from the first extension of the first support.

In one example, the air fryer basket accessory the air fryer basket accessory is configured to be rotatable about the linear axis relative to the air fryer basket.

In one example, the air fryer basket accessory includes first and second configurations. In the first configuration, the second plate is located below the first plate, and in the second configuration, the first plate is located below the second plate. The handle is fixed to the first extension and is not fixed to the second extension, such that the air fryer basket accessory in the first configuration is opened by the first plate being rotated to the second plate, and such that the air fryer basket accessory in the second configuration is not opened.

Another embodiment of the present disclosure provides an air fryer basket accessory system including an air fryer basket accessory. The air fryer basket accessory includes: a first plate configured to be supported by an air fryer basket; a second plate rotatably connected to the first plate, the second plate configured to be supported by the air fryer basket; and a first support extending from at least one of the first plate and the second plate, the first support being configured to be supported by the air fryer basket. The first support includes: a first extension extending from the first plate; and a second extension extending from the second plate. The air fryer basket accessory system further includes a locking structure. The locking structure includes: an accommodation space configured to accommodate the first support of the air fryer basket; and a first gap including a first width. The first extension includes a part that is smaller than the first width of the first gap such that the first extension is allowed to go through the first gap from the accommodation space toward outside of the accommodation space. The second extension includes a part that is larger than the first width of the first gap such that the second extension is not allowed to go through the first gap from the accommodation space toward the outside of the accommodation space.

In one example, the locking structure includes at least one projection that forms the first gap of the locking structure.

In one example, the locking structure includes a second gap. The first gap is located between the accommodation space and the second gap, and the second gap includes a second width larger than the first width of the first gap.

In one example, the second extension is provided with a first recess, the part of the first extension is disposed in the first recess of the second extension, and the first recess includes a width smaller than the first width of the first gap.

In one example, the second extension is provided with a second recess, the second recess is recessed from a bottom of the first recess, the second recess includes a width that is smaller than the width of the first recess.

Another embodiment of the present disclosure provides an air fryer including an air fryer basket and an air fryer basket accessory. The air fryer basket accessory includes a first plate and a second plate. The first plate is configured to be supported by the air fryer basket. The second plate is rotatably connected to the first plate. The second plate is configured to be supported by the air fryer basket.

In one example, the air fryer basket accessory further comprises a first support extending from at least one of the first plate and the second plate, the first support being configured to be supported by the air fryer basket.

In one example, the air fryer basket includes a first cutout, and the first support of the air fryer basket accessory is supported by the first cutout of the air fryer basket.

In one example, the air fryer basket accessory further comprises a second support extending from at least one of the first plate and the second plate, the second support being configured to be supported by the air fryer basket. The first support and the second support extend along a same linear axis.

In one example, the air fryer basket includes a second cutout, and the second support of the air fryer basket accessory is supported by the second cutout of the air fryer basket.

In one example, the air fryer basket accessory is rotatable about the linear axis by rotating the first support in the first cutout.

In one example, the first support includes: a first extension extending from the first plate; and a second extension extending from the second plate.

In one example, the air fryer basket accessary comprises a handle configured to be fixed to the first extension of the first support.

In one example, the handle is removable from the first extension of the first support.

In one example, the air fryer basket accessory includes first and second configurations. In the first configuration, the second plate is located below the first plate, and in the second configuration, the first plate is located below the second plate. The handle is fixed to the first extension and is not fixed to the second extension, such that the air fryer basket accessory in the first configuration is opened by the first plate being rotated to the second plate, and such that the air fryer basket accessory in the second configuration is not opened.

In one example, the air fryer further comprises a locking structure. The locking structure includes: an accommodation space configured to accommodate the first support of the air fryer basket; and a first gap including a first width. The first extension includes a part that is smaller than the first width of the first gap such that the first extension is allowed to go through the first gap from the accommodation space toward outside of the accommodation space, and the second extension includes a part that is larger than the first width of the first gap such that the second extension is not allowed to go through the first gap from the accommodation space toward the outside of the accommodation space.

In one example, the locking structure includes at least one projection that forms the first gap of the locking structure.

In one example, the locking structure is fixed to the air fryer basket.

In one example, the locking structure includes a second gap. The first gap is located between the accommodation space and the second gap, and the second gap includes a second width larger than the first width of the first gap.

In one example, the second extension is provided with a first recess, the part of the first extension is disposed in the first recess of the second extension, and the first recess includes a width smaller than the first width of the first gap.

In one example, the second extension is provided with a second recess. The second recess is recessed from a bottom of the first recess, the second recess includes a width that is smaller than the width of the first recess.

Another embodiment of the present disclosure provides an air fryer basket system including: an air fryer basket and a locking structure. The air fryer basket is configured to support an air fryer basket accessory. The air fryer basket accessory includes: a first plate; a second plate rotatably connected to the first plate; and a first support extending from at least one of the first plate and the second plate. The air fryer basket includes a first cutout configured to support the first support of the air fryer basket accessory. The locking structure is fixed to the air fryer basket. The locking structure is configured to lock the first support of the air fryer basket accessory.

In one example, the first support includes: a first extension extending from the first plate; and a second extension extending from the second plate. The locking structure includes: an accommodation space configured to accommodate the first support of the air fryer basket; and a first gap including a first width. The first extension includes a part that is smaller than the first width of the first gap such that the first extension is allowed to go through the first gap from the accommodation space toward outside of the accommodation space, and the second extension includes a part that is larger than the first width of the first gap such that the second extension is not allowed to go through the first gap from the accommodation space toward the outside of the accommodation space.

Another embodiment of the present disclosure provides a method, including: disposing an air fryer basket accessory on an air fryer basket, the air fryer basket accessory comprising: a first plate; a second plate rotatably connected to the first plate; and a first support extending from at least one of the first plate and the second plate. The disposing includes disposing the first support of the fryer basket accessory in a first cutout of the air fryer basket.

In one example, the method further comprises rotating the air fryer basket accessory with rotating the first support of the air fryer basket accessory in the first cutout of the air fryer basket.

In one example, the rotating of the air fryer basket accessory is performed by rotating a handle fixed to the first support of the air fryer basket accessory.

In one example, the method further comprises removing the handle from the first extension of the first support after the rotating of the handle.

In one example, the first support includes: a first extension extending from the first plate; and a second extension extending from the second plate. The rotating of the air fryer basket accessory includes changing the fryer basket accessory from a first configuration to a second configuration. In the first configuration, the second plate is located below the first plate, and in the second configuration, the first plate is located below the second plate. The handle is fixed to the first extension and is not fixed to the second extension, such that the air fryer basket accessory in the first configuration is opened by the first plate being rotated to the second plate, and such that the air fryer basket accessory in the second configuration is not opened.

In one example, the disposing of the air fryer basket accessory includes accommodating the first support of the air fryer basket in an accommodation space of a locking structure. The locking structure includes a first gap including a first width. The first extension includes a part that is smaller than the first width of the first gap such that the first extension is allowed to go through the first gap from the accommodation space toward outside of the accommodation space. The second extension includes a part that is larger than the first width of the first gap such that the second extension is not allowed to go through the first gap from the accommodation space toward the outside of the accommodation space.

DRAWINGS

EMBODIMENTS

Figure 1:
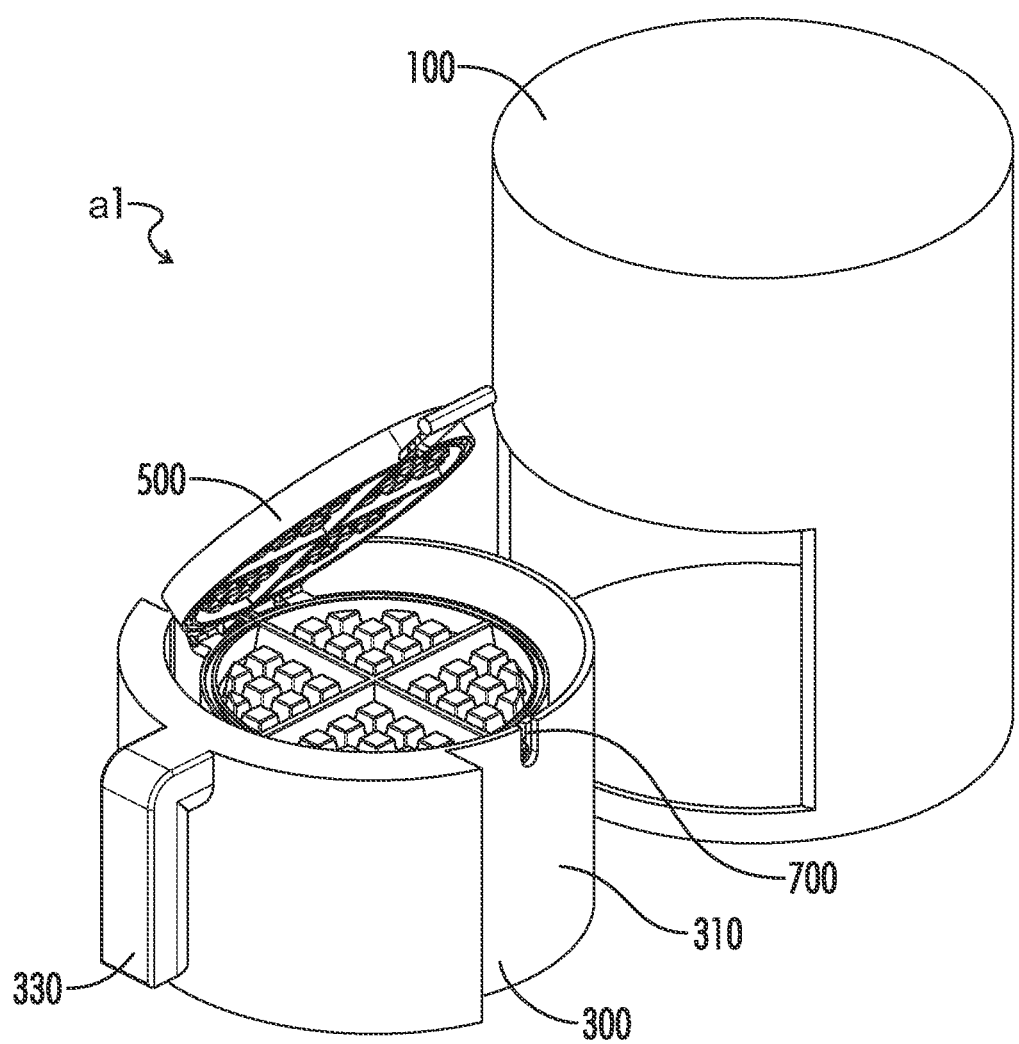
FIGS. 1 and 2 illustrate perspective views of an air fryer according to one embodiment.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 2:
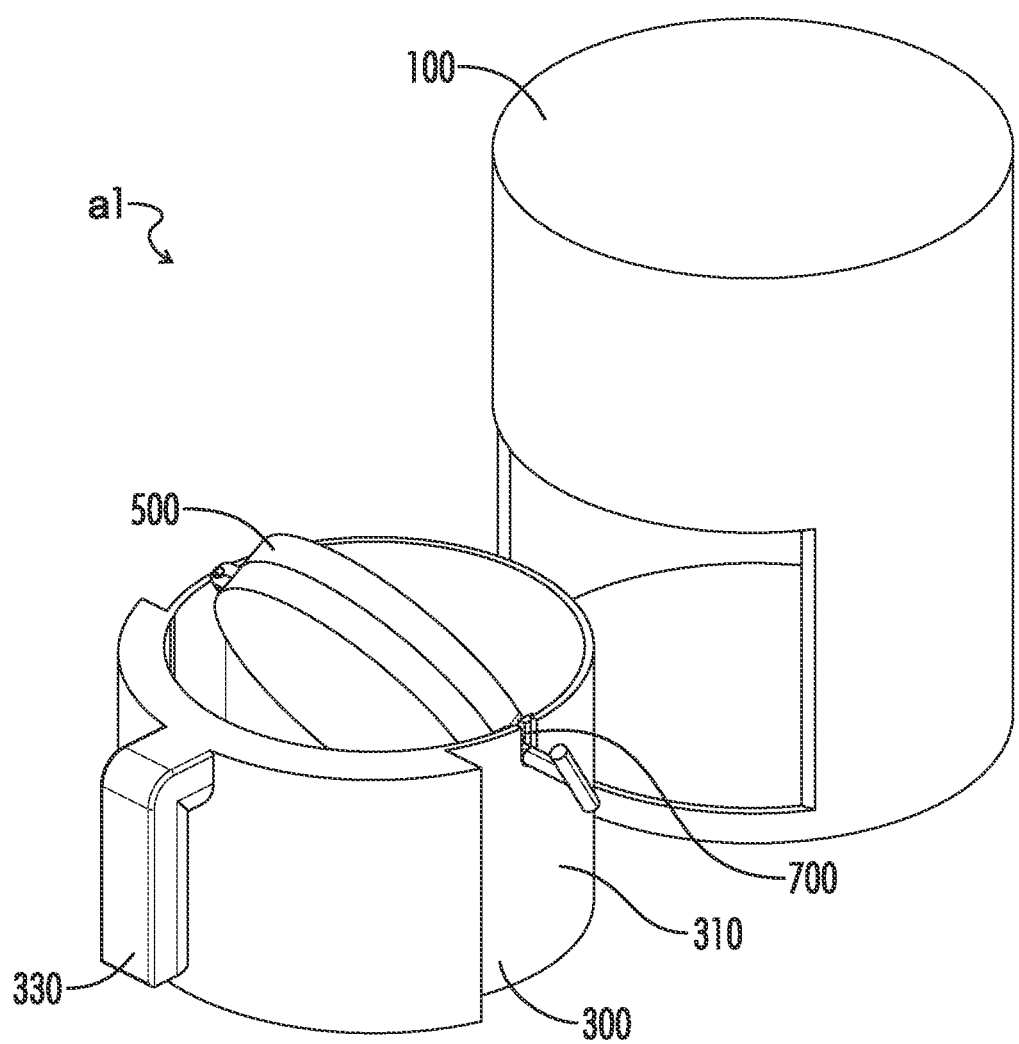

FIGS. 1 and 2 illustrate perspective views of an air fryer according to one embodiment.

The air fryer al of FIGS. 1 and 2 may employ hot-air-flow to cook food products. The food products may include, but are not limited to, French fries, chicken, onion rings, combination thereof, and other type of food products. The air fryer al may include a housing 100, an air fryer basket 300, an air fryer basket accessory 500, and a locking structure 700. The present disclosure may include an opening, a rotating, and a locking mechanism that allow the air fryer basket accessory 500 to be mounted in the air fryer basket 300. The air fryer al may further include a heater (not shown) and a fan (not shown) in the housing 100. The fan may circulate hot air heated by the heater inside the air fryer al.

Figure 3:
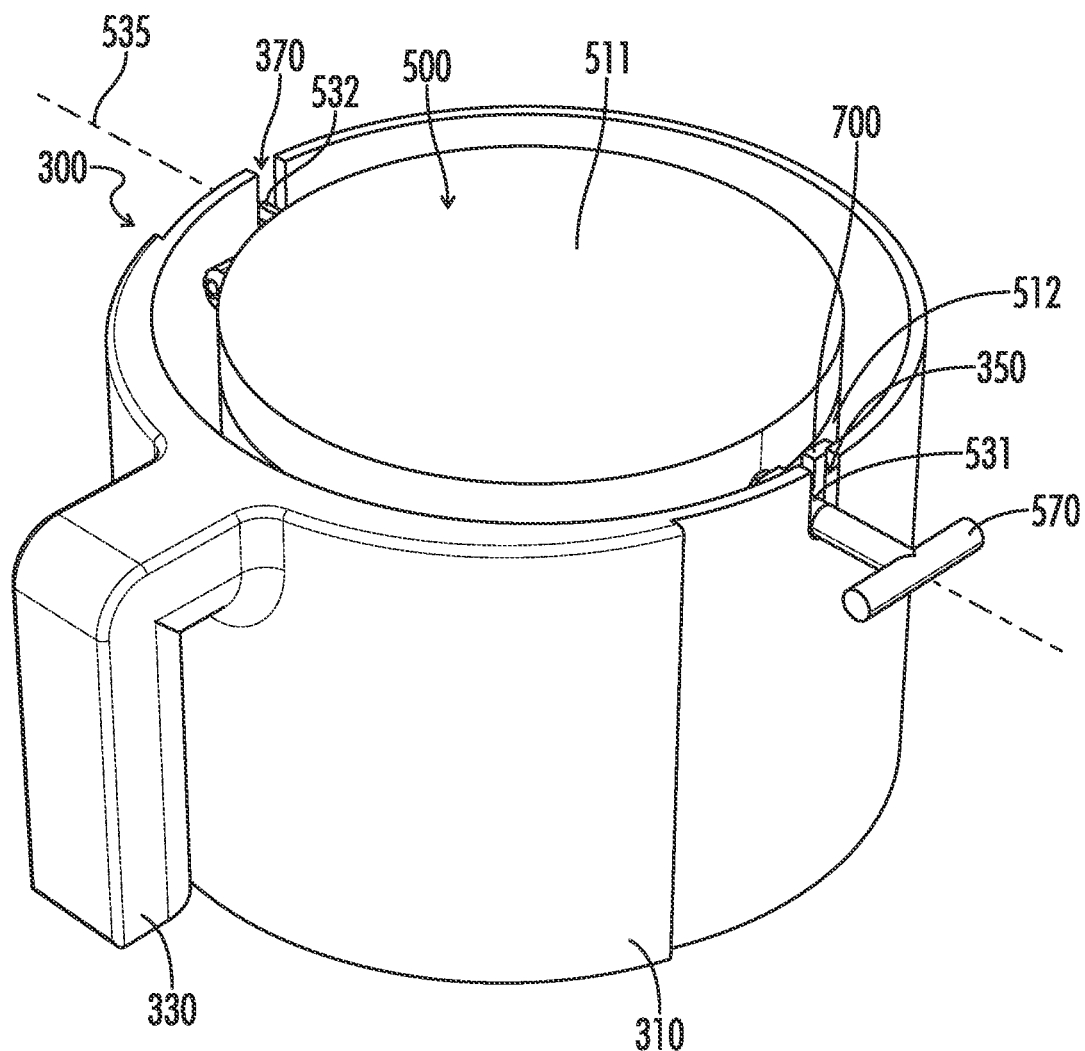
FIGS. 3 and 4 illustrate perspective views of an air fryer basket and an air fryer basket accessory according to one embodiment.
Figure 4:
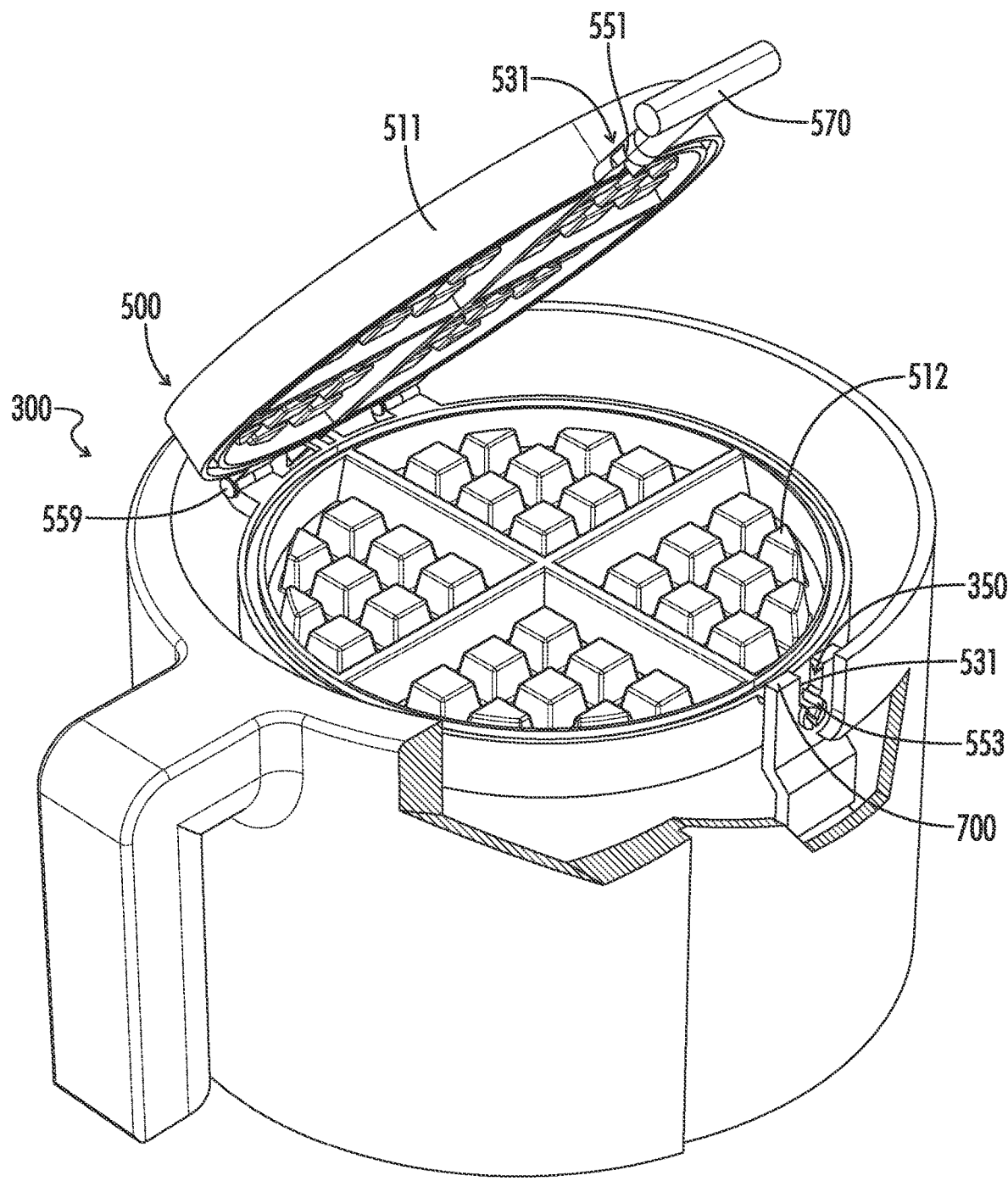

The air fryer basket 300 may be disposed in the housing 100. In the air fryer basket 300, the food products that are to be cooked may be placed. The air fryer basket 300 may include an air fryer basket body 310, and optionally a handle 330 that is fixed to the air fryer basket body 310. FIGS. 3 and 4 illustrate perspective views of the air fryer basket 300. As shown in FIGS. 3 and 4, the air fryer basket body 310 of the air fryer basket 300 may include a first cutout 350 and a second cutout 370. Each of the first cutout 350 and the second cutout 370 may be recessed from the top of the air fryer basket body 310. The first cutout 350 and the second cutout 370 may be configured to support the air fryer basket accessory 500.

Figure 5:
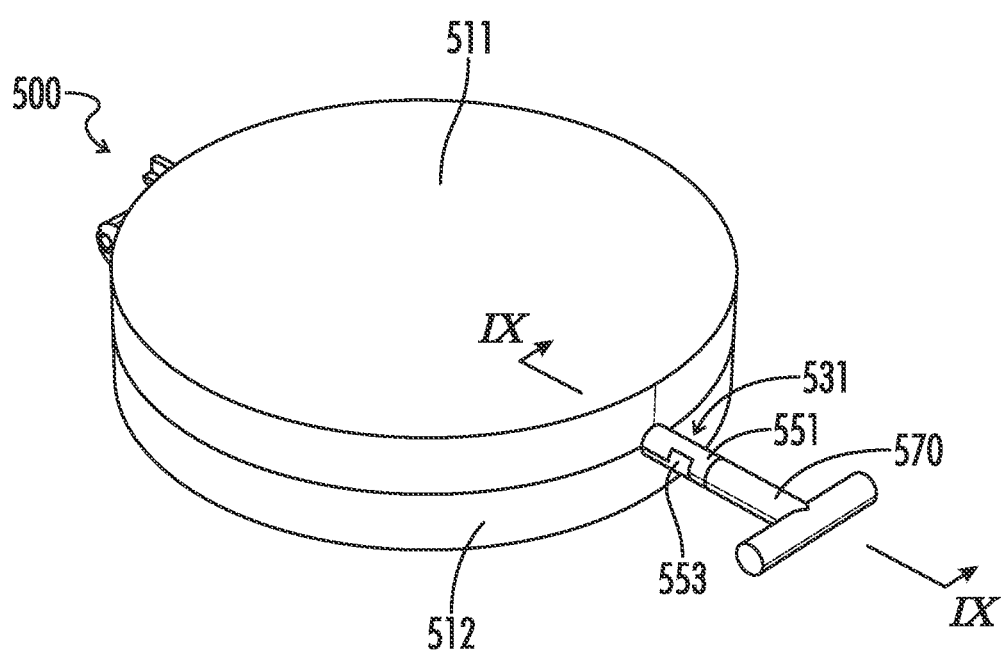
FIG. 5 illustrates a perspective view of an air fryer basket accessory according to one embodiment.
Figure 6:
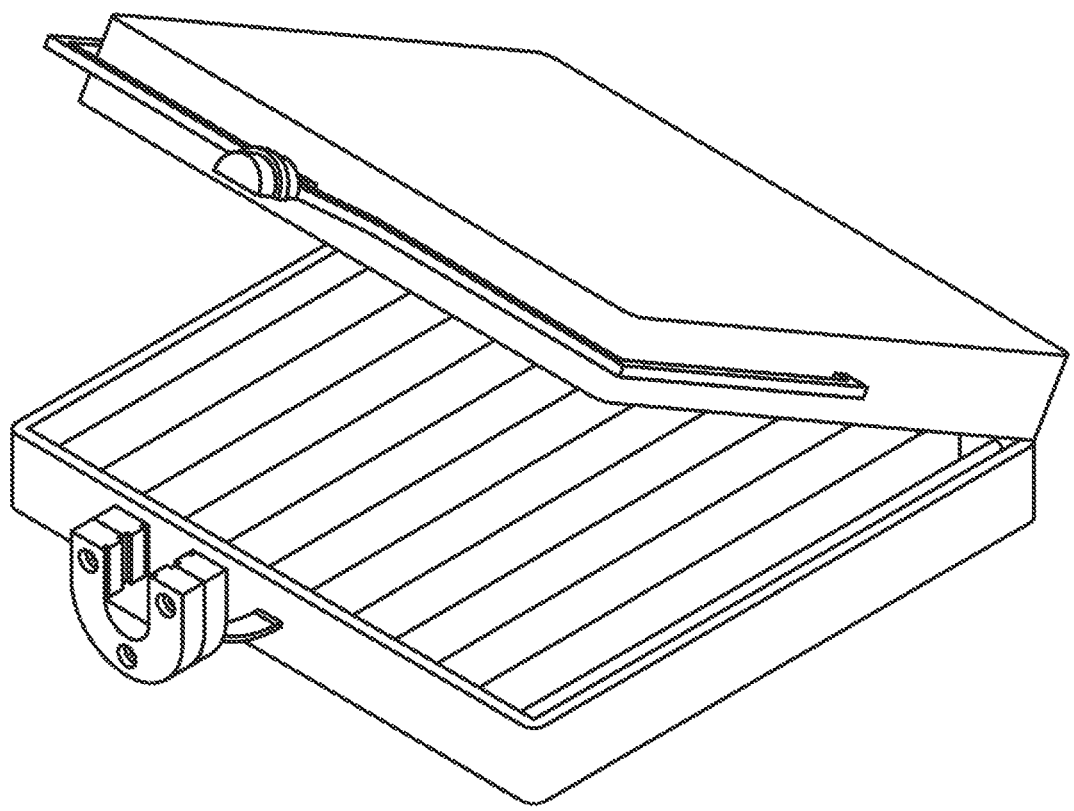
FIG. 6 illustrates a perspective view of an air fryer basket accessory according to another embodiment.

FIG. 5 illustrates a perspective view of the air fryer basket accessory 500. With reference to FIGS. 1-5, the air fryer basket accessory 500 may be configured to be supported by the air fryer basket 300. The air fryer basket accessory 500 may be used to cook food products. In the illustrated example shown in FIGS. 1-5, the air fryer basket accessory 500 may be used to cook waffles. However, the air fryer basket accessory is not limited to a waffle maker but may include a panini maker/grill (see FIG. 6), and a variety of other accessories.

In the illustrated embodiment of FIGS. 3-5, the air fryer basket accessory 500 may include a first plate 511, a second plate 512, a first support 531, and a second support 532 (see FIG. 3). The first plate 511 and second plate 512 may be configured to be supported by the air fryer basket 300 via the first support 531 and the second support 532. The first plate 511 and the second plate 512 may be rotatably connected to each other (for example, via connections 559). Food products that are cooked with the air fryer basket accessory 500 may be placed in a space between the first plate 511 and the second plate 512.

With reference to FIGS. 3-5, the first support 531 may extend from at least one of the first plate 511 and the second plate 512. The first support 531 may be configured to be supported by the air fryer basket 300. In one embodiment, the first support 531 of the air fryer basket accessory 500 may be supported by the first cutout 350 of the air fryer basket 300. In one example, a handle 570 may be fixed to the first support 531. The handle 570 may be a removable T-shaped handle to allow the air fryer basket accessory 500 to fit in the air fryer basket 300 without interference.

With reference to FIG. 3, the second support 532 may extend from at least one of the first plate 511 and the second plate 512. The second support 532 may be configured to be supported by the air fryer basket 300. In one embodiment, the second support 532 of the air fryer basket accessory 500 may be supported by the second cutout 370 of the air fryer basket 300. Further, the second support 532 and the first support 531 may extend along the same linear axis 535. In the illustrated example, the air fryer basket accessory 500 may be configured to be rotatable about the linear axis 535 relative to the air fryer basket 300.

Figure 7:
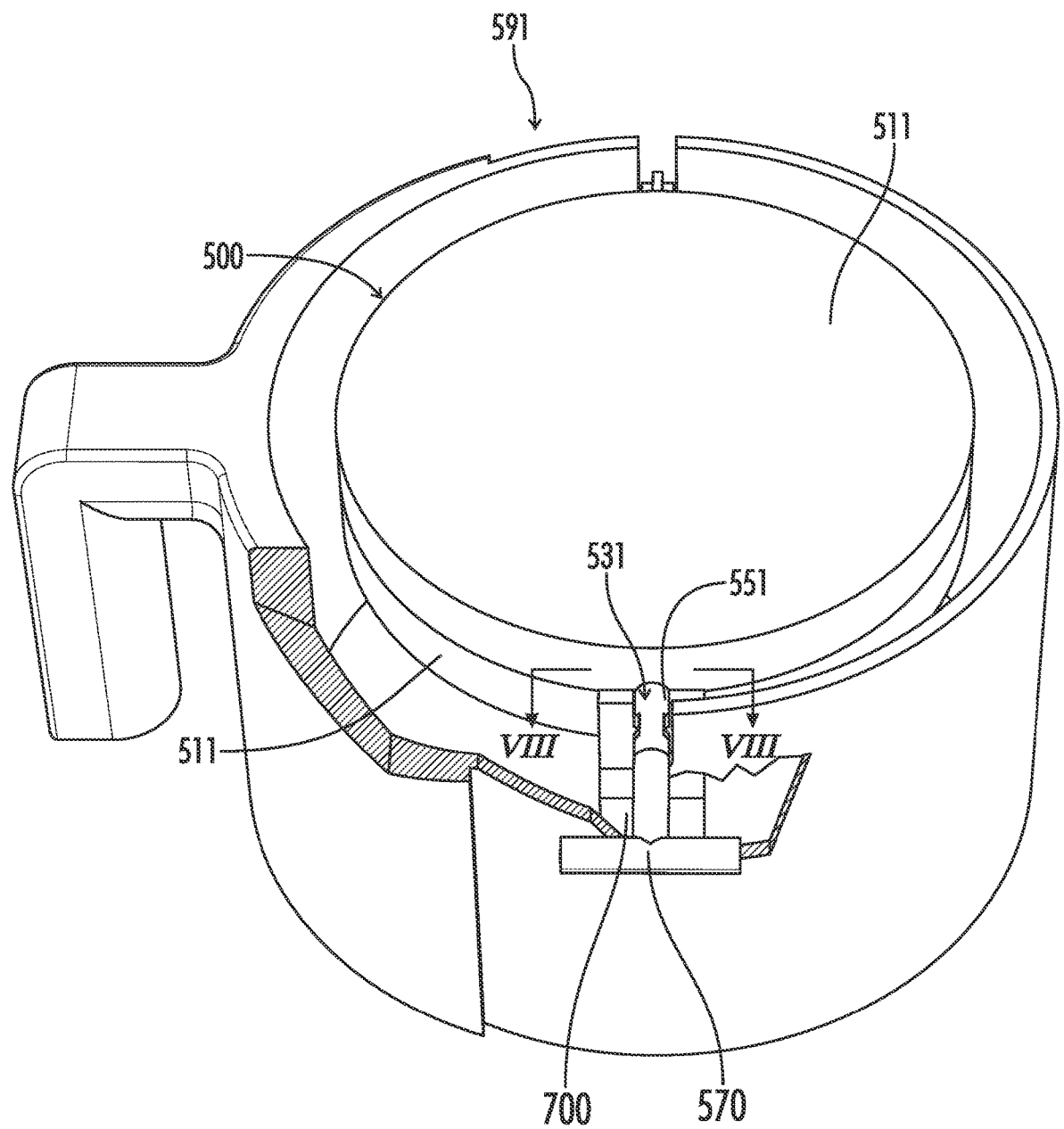
FIG. 7 illustrates an enlarged perspective view of an air fryer basket accessory and a locking structure according to one embodiment.
Figure 8:
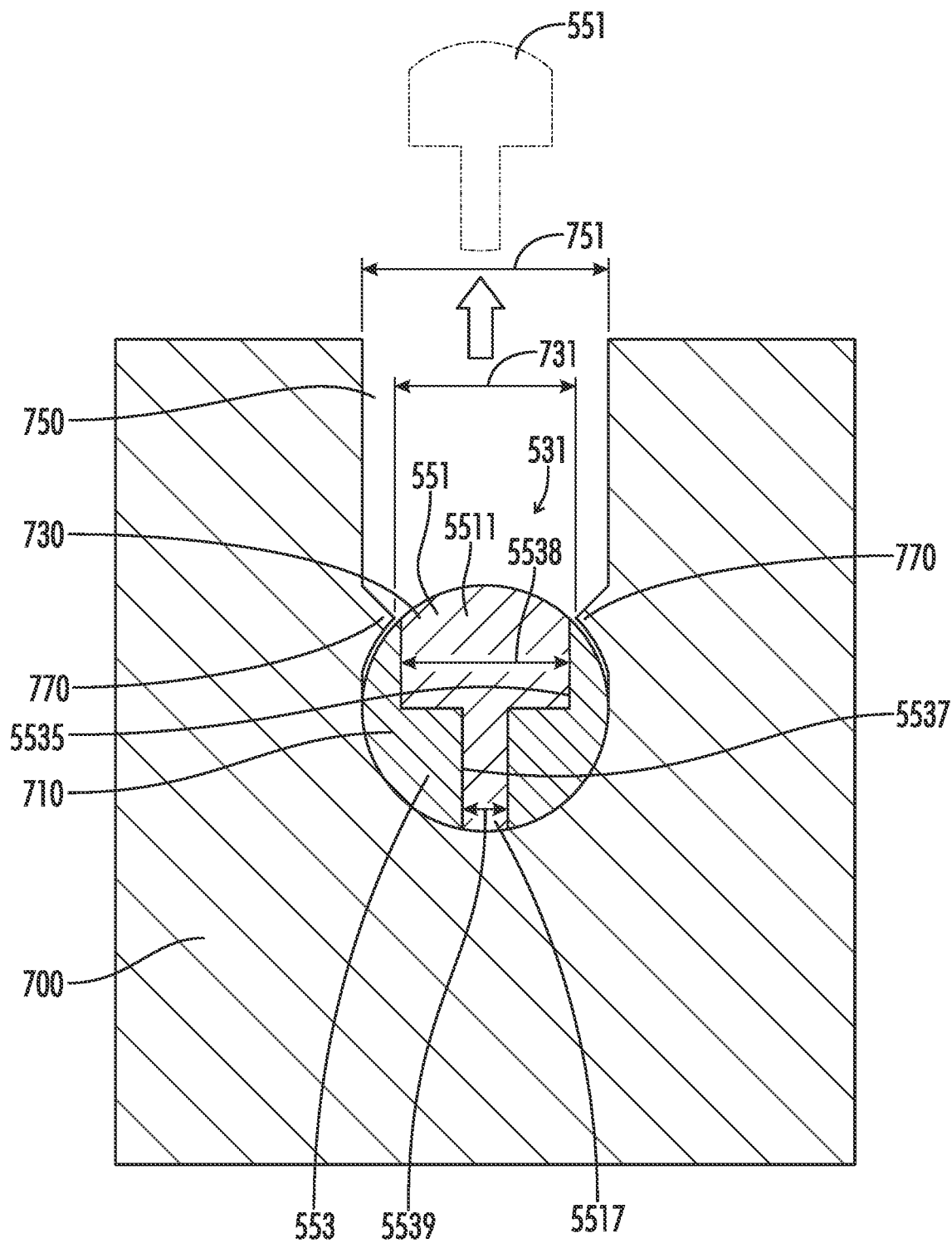
FIG. 8 illustrates a sectional view taken along line VIII-VIII in FIG. 7.

FIG. 7 illustrates an enlarged perspective view of the air fryer basket accessory 500 and the locking structure 700. FIG. 8 illustrates a sectional view taken along line VIII-VIII in FIG. 7.

The locking structure 700 and the air fryer basket 300 may form an air fryer basket system. The locking structure 700 and the air fryer basket accessory 500 may form an air fryer basket accessory system. As shown in FIG. 8, the locking structure 700 may include an accommodation space 710, a first gap 730, and a second gap 750. The accommodation space 710 may be configured to accommodate the first support 531 of the air fryer basket 300. The first gap 730 is located between the accommodation space 710 and the second gap 750. The first gap 730 may include a first width 731. In one embodiment, the first gap 730 may be formed by at least one projection 770 (e.g., two projections 770 in FIG. 8). The second gap 750 may include a second width 751 larger than the first width 731 of the first gap 730.

Figure 9:
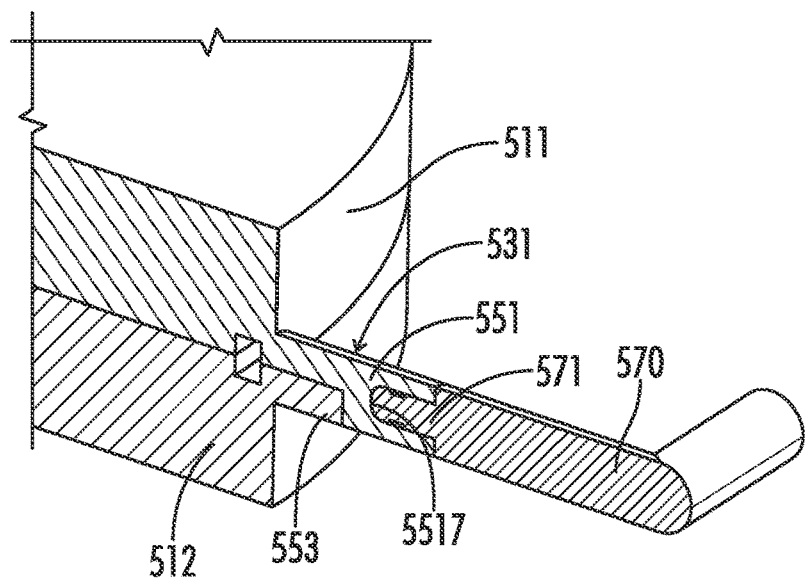
FIG. 9 illustrates a sectional view taken along line IX-IX in FIG. 5.
Figure 10:
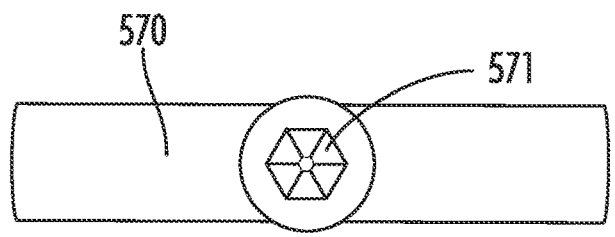
FIG. 10 illustrates a front view of a handle according to one embodiment.
Figure 11:
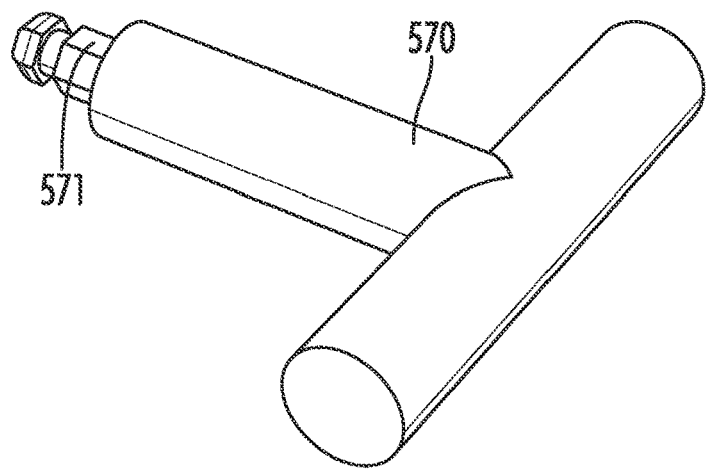
FIG. 11 illustrates a perspective view of a handle according to one embodiment.

FIG. 9 illustrates a sectional view taken along line IX-IX in FIG. 5. In one embodiment, as shown in FIGS. 7-9, the first support 531 may include a first extension 551 and a second extension 553. The first extension 551 may extend from the first plate 511 and the second extension 553 may extend from the second plate 512. As shown in FIG. 9, the first extension 551 may include a recess 5517 (e.g., hexagonal hole) with which the tip 571 (see also FIGS. 10 and 11) of the handle 570 may match to allow the air fryer basket accessory 500 to be rotated with less or no slipping.

In one embodiment, as shown in FIG. 8, the second extension 553 may be provided with a first recess 5535 and a second recess 5537. In the first recess 5535, a part 5511 of the first extension 551 may be disposed. The second recess 5537 may be recessed from a bottom of the first recess 5535. The second recess 5537 may include a width 5539 that is smaller than a width 5538 of the first recess 5535. In the second recess 5537, a part 5517 of the first extension 551 may be disposed.

Figure 12:
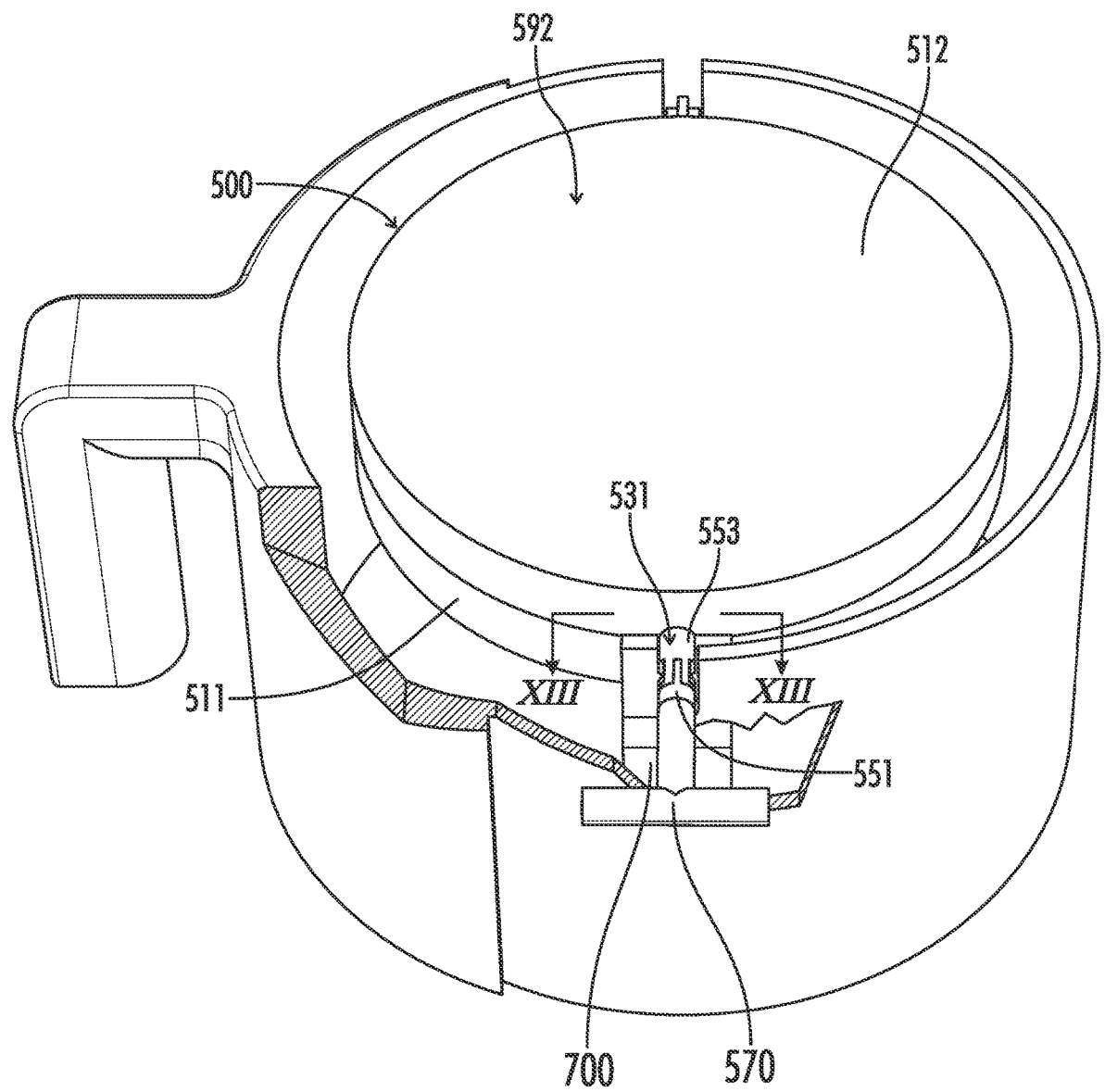
FIG. 12 illustrates an enlarged perspective view of an air fryer basket accessory and a locking structure according to one embodiment.
Figure 13:
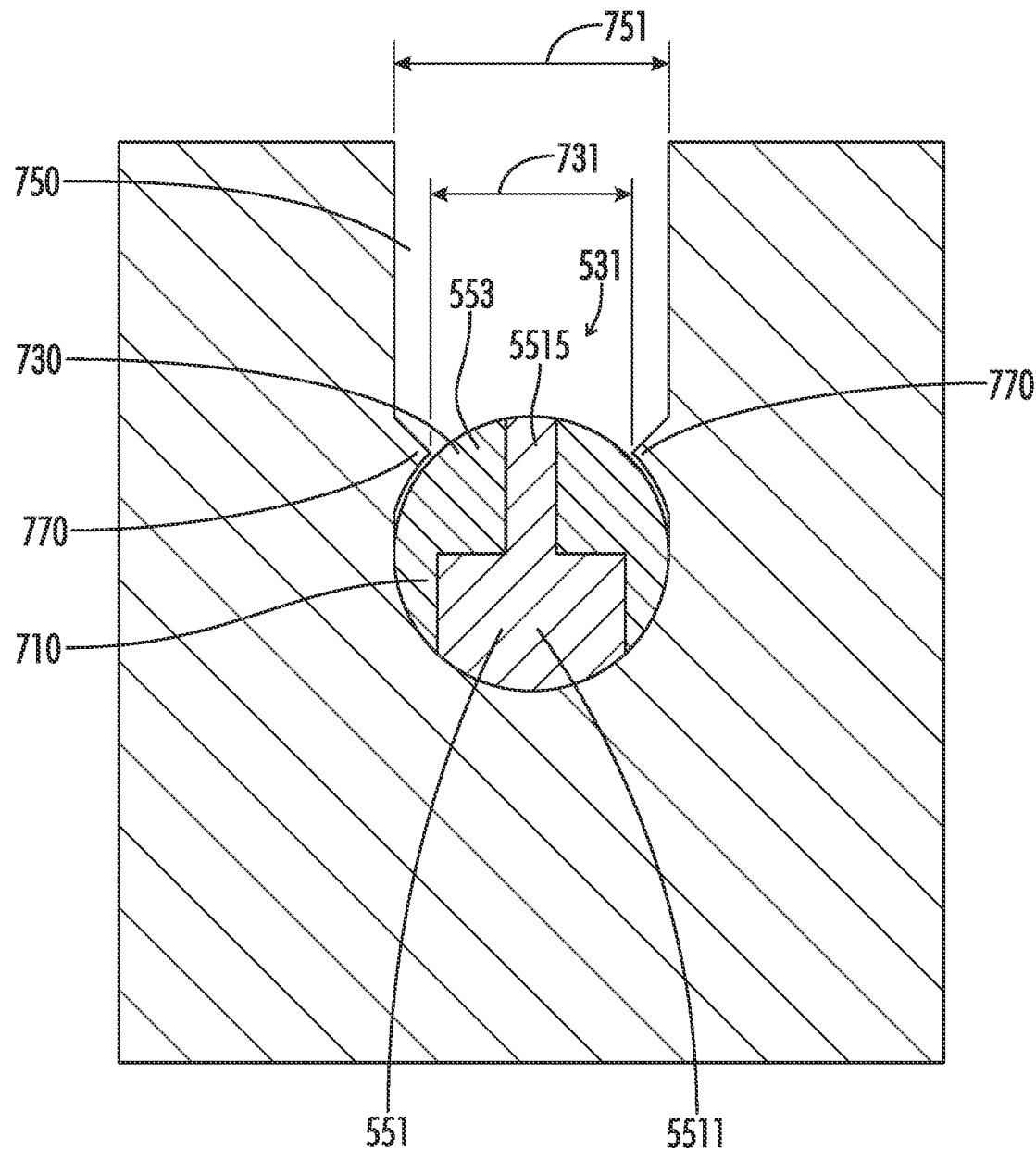
FIG. 13 illustrates a sectional view taken along line XIII-XIII in FIG. 12.

As stated above, the air fryer basket accessory 500 may be rotatable, and thus the air fryer basket accessory 500 may include a first configuration 591 (e.g., unlocked configuration, as shown in FIG. 7) and a second configuration 592 (e.g., locked configuration, as shown in FIG. 12). For example, FIGS. 3-5 and 7-9 show the first configuration 591, in which the second plate 512 may be located below the first plate 511. FIGS. 12 and 13 show the second configuration 592, in which the first plate 511 may be located below the second plate 512. In one example, as shown in FIG. 9, the handle 570 is fixed to the first extension 551 and is not fixed to the second extension 553, such that the air fryer basket accessory 500 in the first configuration 591 is opened by the first plate 511 being rotated to the second plate 512, and such that the air fryer basket accessory 500 in the second configuration 592 is not opened. As such, in the first configuration 591 the air fryer basket accessory 500 may be unlocked, and in the second configuration 592 the air fryer basket accessory 500 may be locked. Such locking may be realized as discussed below.

In one embodiment, as shown in FIG. 8, the part 5511 of the first extension 551 may be smaller than the first width 731 of the first gap 730 such that the first extension 551 is allowed to go through the first gap 730 from the accommodation space 710 toward outside of the accommodation space 710, in the first configuration 591 (e.g., unlocked configuration as shown in FIGS. 4, 7 and 8) of the air fryer basket accessory 500. That is, in the first configuration 591 (e.g., unlocked configuration as shown in FIGS. 4, 7 and 8), if the user attempts to lift the handle 570, the first plate 511 may be lifted, and the air fryer basket accessory 500 may be opened. In contrast, as shown in FIG. 13, the second extension 553 may include a part that is larger than the first width 731 of the first gap 730 such that the second extension 553 is not allowed to go through the first gap 730 from the accommodation space 710 toward the outside of the accommodation space 710, in the second configuration 592 (e.g., locked configuration as shown in FIGS. 12 and 13) of the air fryer basket accessory 500. That is, in the second configuration 592 (e.g., locked configuration as shown in FIGS. 12 and 13), even if the user attempts to lift the handle 570, the locking structure 700 may prevent both of the first plate 511 and the second plate 512 from being lifted, and thus the air fryer basket accessory 500 may be prevented from being opened.

Figure 14:
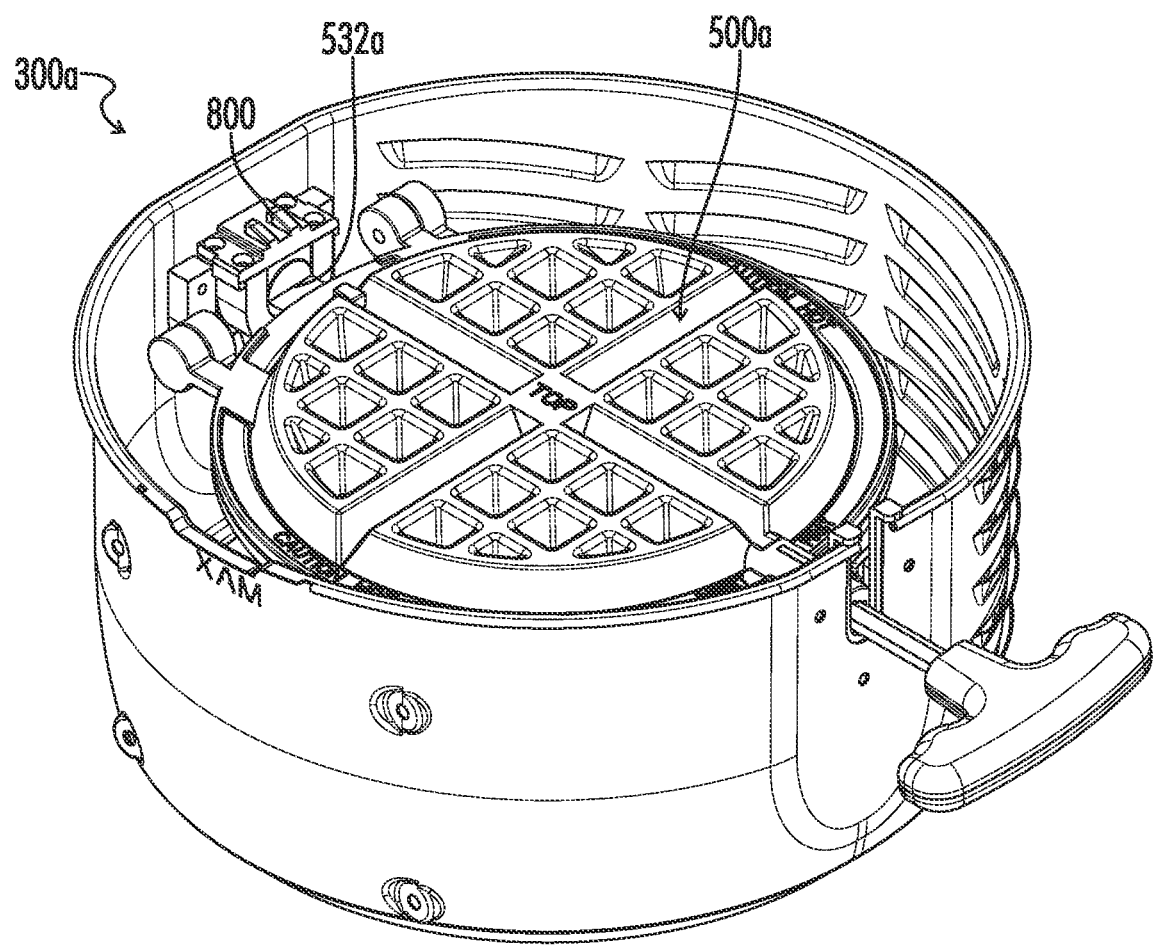
FIG. 14 illustrates a perspective view of an air fryer basket, an air fryer basket accessory, and a locking structure according to another embodiment.
Figure 15:
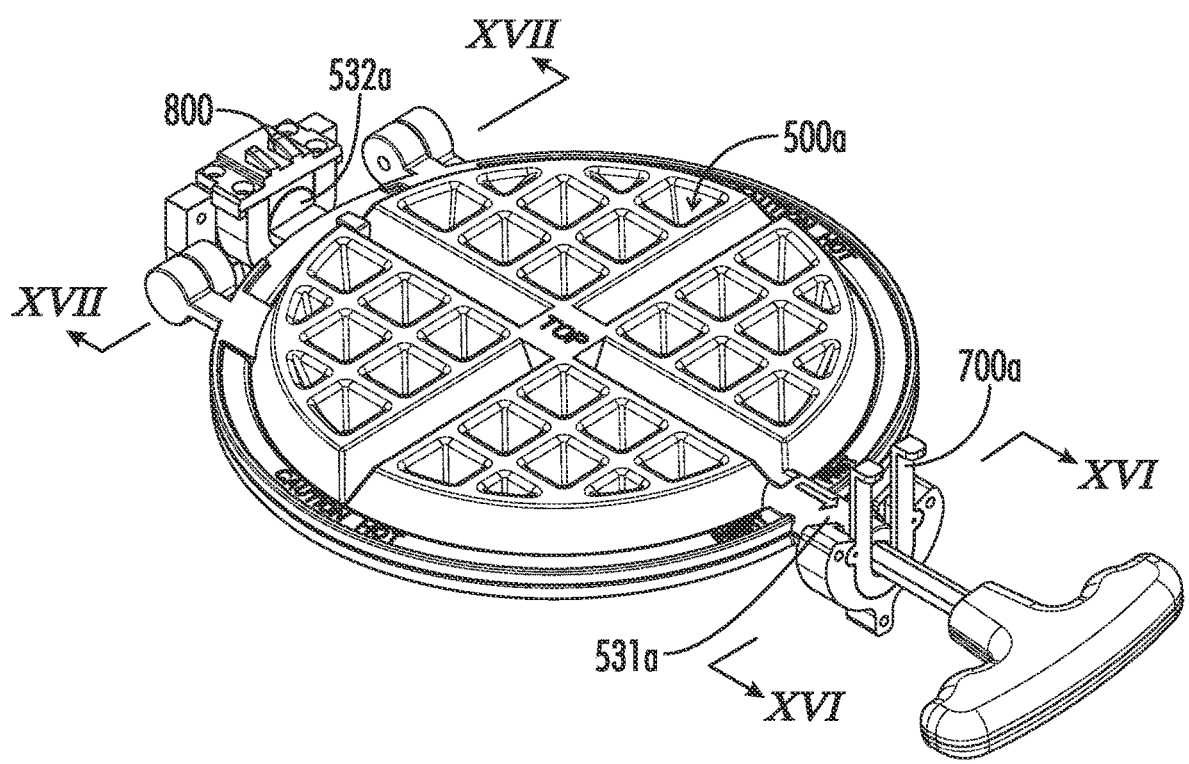
FIG. 15 illustrates a perspective view of an air fryer basket accessory, and a locking structure according to another embodiment.
Figure 16:
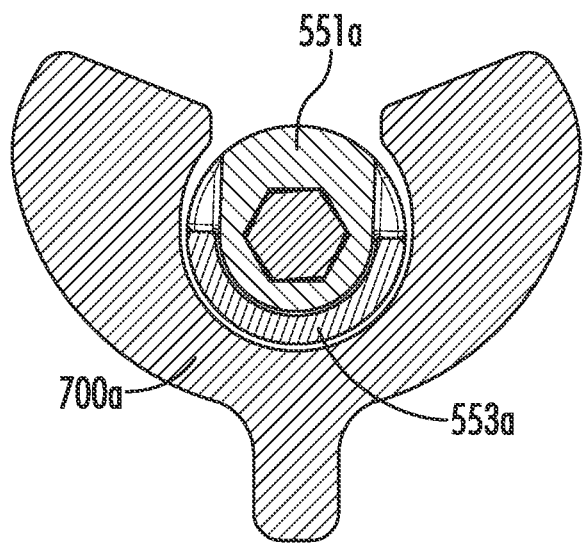
FIG. 16 illustrates a sectional view taken along line XVI-XVI in FIG. 15.
Figure 17:
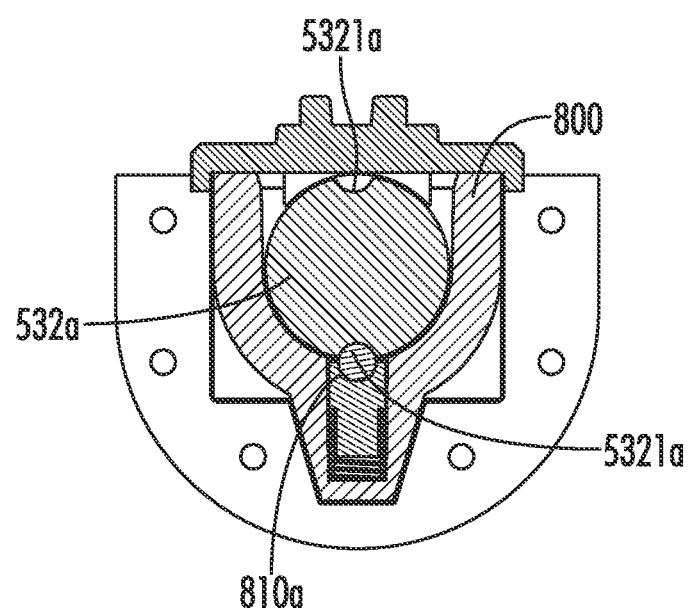
FIG. 17 illustrates a sectional view taken along line XVII-XVII in FIG. 15.

FIG. 14 illustrates a perspective view of an air fryer basket, an air fryer basket accessory, and a locking structure according to another embodiment. FIG. 15 illustrates a perspective view of an air fryer basket accessory, and a locking structure according to another embodiment. FIG. 16 illustrates a sectional view taken along line XVI-XVI in FIG. 15. FIG. 17 illustrates a sectional view taken along line XVII-XVII in FIG. 15.

In the embodiment shown in FIGS. 14-17, the locking structure 700a and the first support 531a that includes a first extension 551a and a second extension 553a are the substantially the same as the locking structure 700 and the first support 531 shown in FIG. 8 except for that the locking structure 700a does not include the second gap 750 as shown in FIG. 8. With reference to FIGS. 14, 15, and 17, an additional component 800 may be attached to the air fryer basket 300a. The additional component 800 is to ensure smooth rotation of the air fryer basket accessory 500a and may be affixed to the second support 532a (rear shaft of the bottom plate) that couples with a support ledge affixed to the basket 300a, which acts as a better plate support. The second support 532a (rear shaft of the bottom plate) may include a couple of grooves 5321a, in which a spring-loaded pin or ball bearing 810 can slide into and prevent both plates of the air fryer basket accessory 500a from rotating, thereby creating a checking location in the rotation of the basket accessory 500a, for example, while pouring batter and while baking.

Figure 18:
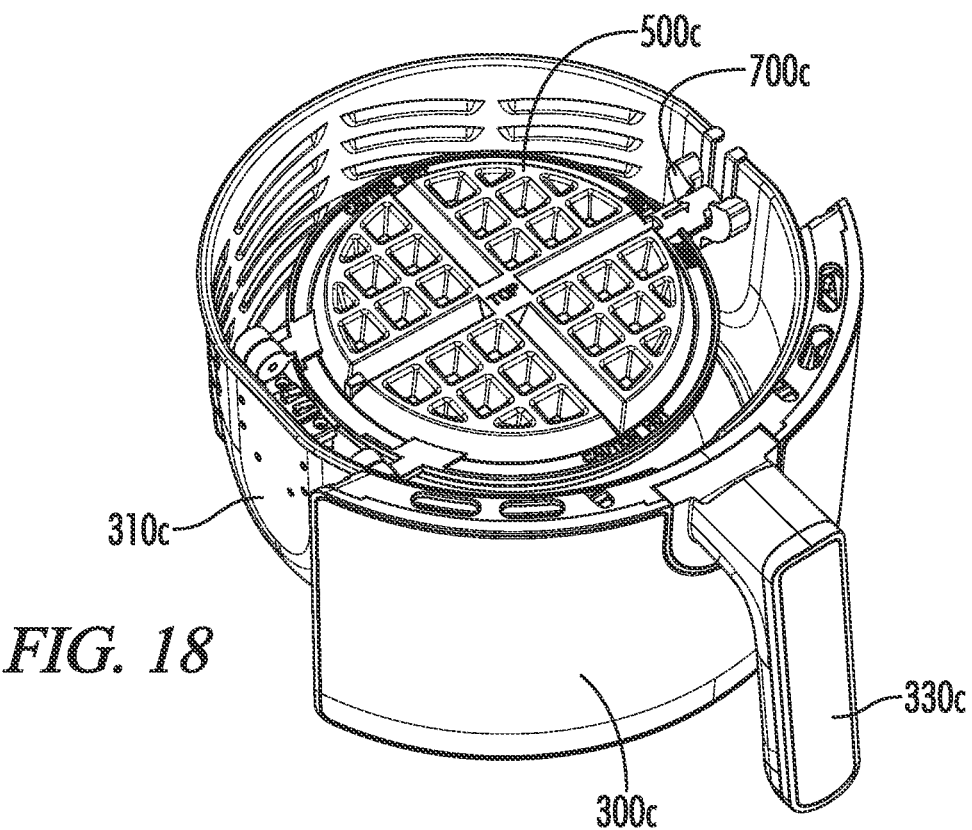
FIGS. 18 and 19 illustrate perspective views of an air fryer basket and an air fryer basket accessory according to one embodiment.
Figure 19:
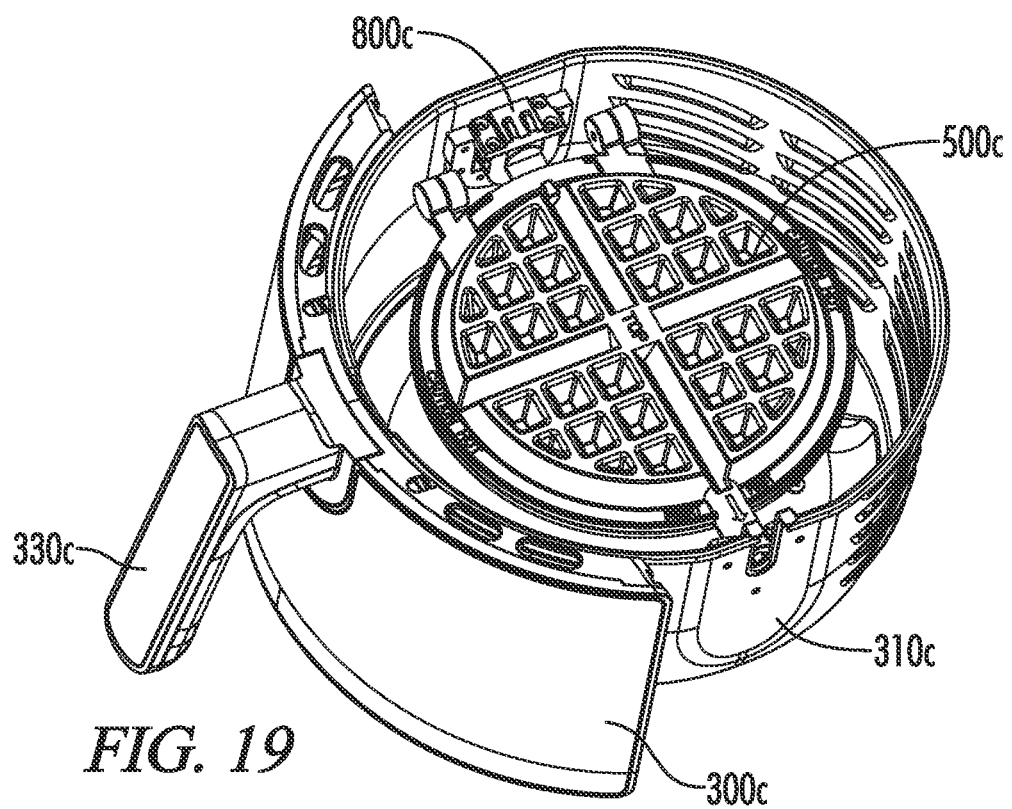

FIGS. 18 and 19 illustrate perspective views of an air fryer basket 300c and an air fryer basket accessory 500c according to one embodiment. The air fryer basket 300c includes a handle 330c, and is substantially the same as the air fryer basket 300 shown in FIG. 3, except that the front shapes of the air fryer baskets 300 and 300c are different from each other. In the example shown in FIGS. 18 and 19, a locking structure 700c and an additional component 800c may be attached to the air fryer basket 300c. The locking structure 700c and the additional component 800c in FIGS.

18 and 19 may include substantially the same structures as the locking structure 700 and the additional component 800 in FIG. 15, respectively.

Figure 20:
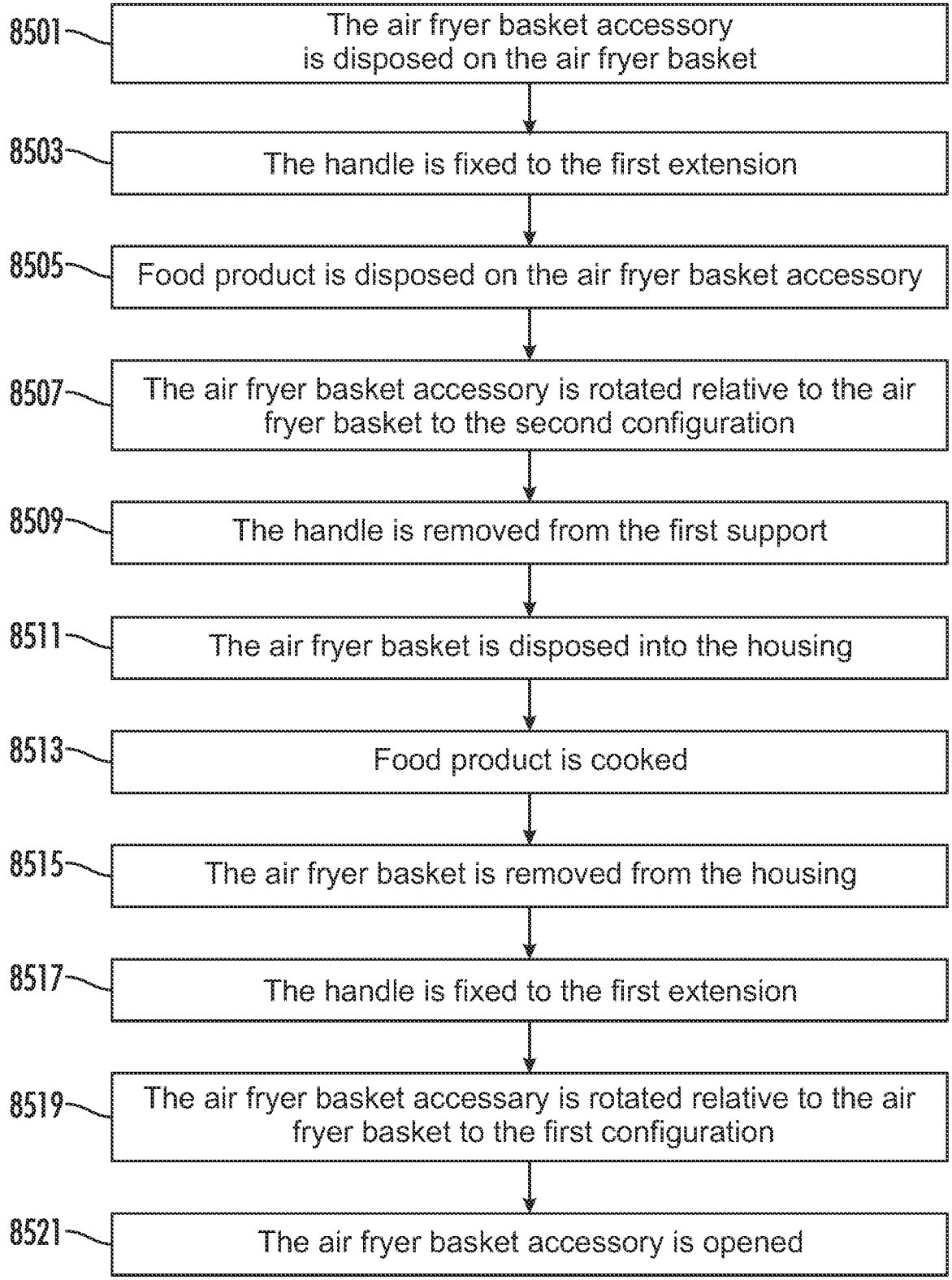
FIG. 20 illustrates a flowchart showing use of an air fryer basket accessory according to an embodiment.

FIG. 20 illustrates a flowchart showing use of an air fryer basket accessory according to an embodiment. With reference to FIG. 20, when using the air fryer basket accessory 500, in 8501, the air fryer basket accessory 500 may be disposed on the air fryer basket 300. The disposing of the air fryer basket accessory 500 may include disposing the first support 531 of the fryer basket accessory 500 in the first cutout 350 of the air fryer basket 300. In addition, the disposing of the air fryer basket accessory 500 may include disposing the second support 532 of the fryer basket accessory 500 in the second cutout 370 of the air fryer basket 300.

In 8503, the handle 570 may be fixed to the first extension 551 of the first support 531. The handle 570 may not be fixed to the second extension 553 of the first support 531. At this timing, the air fryer basket accessory 500 may be in the first configuration 591, where the second plate 512 is located below the first plate 511. In the first configuration 591, the first extension 551 is allowed to go through the first gap 730 from the accommodation space 710 toward outside of the accommodation space 710. Therefore, the air fryer basket accessory 500 in the first configuration 591 may be opened by the first plate 511 being rotated to the second plate 512, for example, by using the handle 570.

Then, in 8505, a food product may be disposed on the air fryer basket accessory 500, for example, on the second plate 512 of the air fryer basket accessory 500.

In 8507, the air fryer basket accessory 500 may be rotated relative to the air fryer basket 300 with rotating the first support 531 of the air fryer basket accessory 500 in the first cutout 350 of the air fryer basket 300, for example, by using the handle 570. In one example, the air fryer basket accessory 500 may be rotated with rotating the second support 532 of the air fryer basket accessory 500 in the second cutout 370 of the air fryer basket 300. As such, the fryer basket accessory 500 may be changed from the first configuration 591 to the second configuration 592.

At this time, the air fryer basket accessory 500 may be in the second configuration 592, where the first plate 511 is located below the second plate 512. In the second configuration 592, the second extension 553 is not allowed to go through the first gap 730 from the accommodation space 710 toward the outside of the accommodation space 710. Therefore, the air fryer basket accessory 500 in the second configuration 592 can not be opened.

In 8509, the handle 570 may be removed from the first extension 551 of the first support 531 after using the handle 570. In 8011, the air fryer basket 300 with the air fryer basket accessory 500 may be disposed into the housing 100 (e.g., slid into the housing in one example). In this time, interference of the air fryer basket accessory 500 with the housing 100 may be avoided because the handle 570 has been removed from the air fryer basket accessory.

In 8513, the food product in the air fryer basket accessory 500 may be cooked by being heated for an appropriate period of time. In 8515, the air fryer basket 300 with the air fryer basket accessory 500 may be removed from the housing 100 (e.g., slid from the housing in one example). In 8517, the handle 570 may be fixed to the first extension 551 of the first support 531.

In 8519, the air fryer basket accessory 500 may be rotated to be changed from the second configuration 592 to the first configuration 591. In 8521, the air fryer basket accessory 500 may be opened by using the handle 570, and the food product that has been cooked may be taken out from the air fryer basket accessory 500.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An air fryer, comprising:
a housing in which heated air is configured to be circulated;
an air fryer basket having an opening defining a mouth of the air fryer basket, the opening being interrupted by at least one cutout; and
an air fryer basket accessory that comprises:
a first plate configured to be supported by the air fryer basket; and
a second plate connected to the first plate, the second plate configured to be supported by the air fryer basket,
wherein the air fryer basket is configured to be removably placed in the housing together with the first and second plates when the air fryer basket accessory is disposed at the opening of the air fryer basket, the air fryer basket accessory being supported by the air fryer basket, and
wherein the at least one cutout is fully enclosed within the housing when the air fryer basket is placed in the housing.

2. The air fryer of claim 1,
wherein the air fryer basket includes an air fryer cavity, and wherein when the air fryer basket is disposed in the housing, the air fryer basket is configured to, by the circulated heated air, cook a food in the air fryer cavity; and
wherein the first plate and the second plate are configured to be integrally rotatable in the air fryer cavity relative to the air fryer basket.

3. The air fryer of claim 1, wherein the air fryer basket accessory further comprises a first support extending from at least one of the first plate and the second plate, the first support being configured to be supported by the air fryer basket.

4. The air fryer of claim 3, wherein the at least one cutout includes a first cutout, and
the first support of the air fryer basket accessory is supported by the first cutout of the air fryer basket, wherein the air fryer basket accessory is rotatable about a linear axis by rotating the first support in the first cutout.

5. The air fryer of claim 4, wherein when the air fryer basket is placed in the housing, the linear axis extends in a direction different from an insertion direction of the air fryer basket to the housing.

6. The air fryer of claim 3, wherein the air fryer basket accessory further comprises a second support extending from at least one of the first plate and the second plate, the second support being configured to be supported by the air fryer basket, and the first support and the second support extend along a same linear axis.

7. The air fryer of claim 6, wherein the at least one cutout includes a second cutout, and the second support of the air fryer basket accessory is supported by the second cutout of the air fryer basket.

8. The air fryer of claim 3, wherein the first support includes:

a first extension extending from the first plate; and
a second extension extending from the second plate.

9. The air fryer of claim 8, wherein the air fryer basket accessory comprises a handle configured to be fixed to the first extension of the first support.

10. The air fryer of claim 9, wherein the handle is removable from the first extension of the first support.

11. The air fryer of claim 9, wherein the air fryer basket accessory includes first and second configurations, in the first configuration, the second plate is located below the first plate, and in the second configuration, the first plate is located below the second plate, the handle is fixed to the first extension and is not fixed to the second extension, such that the air fryer basket accessory in the first configuration is opened by the first plate being rotated to the second plate, and such that the air fryer basket accessory in the second configuration is not opened.

12. The air fryer of claim 8, further comprising a locking structure, the locking structure includes:
an accommodation space configured to accommodate the first support of the air fryer basket; and
a first gap including a first width, the first extension includes a part that is smaller than the first width of the first gap such that the first extension is allowed to go through the first gap from the accommodation space toward outside of the accommodation space, and the second extension includes a part that is larger than the first width of the first gap such that the second extension is not allowed to go through the first gap from the accommodation space toward the outside of the accommodation space.

13. The air fryer of claim 12, wherein the locking structure includes at least one projection that forms the first gap of the locking structure, and wherein the locking structure is fixed to the air fryer basket.

14. The air fryer of claim 12, wherein the locking structure includes a second gap, the first gap is located between the accommodation space and the second gap, and the second gap includes a second width larger than the first width of the first gap.

15. The air fryer of claim 12, wherein the second extension is provided with a first recess, the part of the first extension is disposed in the first recess of the second extension, and the first recess includes a width smaller than the first width of the first gap, wherein the second extension is provided with a second recess, the second recess is recessed from a bottom of the first recess, the second recess includes a width that is smaller than the width of the first recess.

16. A method of using the air fryer of claim 1, comprising:
disposing the air fryer basket accessory on the air fryer basket, the air fryer basket accessory comprising a first support extending from at least one of the first plate and the second plate, the disposing including disposing the first support of the fryer basket accessory in a first cutout of the air fryer basket.

17. The method of claim 16, further comprising rotating the air fryer basket accessory with rotating the first support of the air fryer basket accessory in the first cutout of the air fryer basket.

18. The method of claim 17, wherein the rotating of the air fryer basket accessory is performed by rotating a handle fixed to the first support of the air fryer basket accessory, and
wherein the method further comprises removing the handle from a first extension of the first support after the rotating of the handle.

19. The air fryer of claim 1, wherein the air fryer basket accessory has an open and closed configuration, and wherein the first plate and the second plate face to each other when the air fryer basket accessory is in the closed configuration, and
wherein the air fryer basket is configured to be removably placed in the housing together with the first and second plates only when the air fryer basket accessory is in the closed configuration.

20. The air fryer of claim 1, wherein each of the first plate and the second plate is fully enclosed within the housing when the air fryer basket is placed in the housing.

* * * * *